Jan. 1, 1935.                H. O. STEPHENS                1,986,610
TRANSFORMER TEMPERATURE INDICATOR
Filed June 30, 1934

Inventor:
Howard O. Stephens,
by Harry E. Dunham
His Attorney.

Patented Jan. 1, 1935

1,986,610

UNITED STATES PATENT OFFICE 1,986,610

TRANSFORMER TEMPERATURE INDICATOR

Howard O. Stephens, Pittsfield, Mass., assignor to General Electric Company, a corporation of New York Application June 30, 1934, Serial No. 733,192

4 Claims. (Cl. 175—361)

My invention relates to transformer temperature indicators. In the operation of transformers, particularly large power transformers, it is often desirable that some means be provided for indicating the temperatures of the windings as an aid in avoiding excessive overloads and consequent injury to the transformer from overheating. A transformer having only two windings may be provided with a temperature indicator associated with each winding but it is customary to provide an indicator associated only with one winding, usually the low voltage winding, because it is possible to calibrate an indicator under these conditions so that it will indicate the temperature of either winding. It has usually been thought necessary, however, to provide a temperature indicator associated with each winding of a three-winding transformer because the ratio between the load and the temperature in any one winding and the load or temperature in either of the other windings may vary through wide limits and an indicator associated with any one winding cannot be calibrated to indicate the temperature of either of the other windings under all possible load conditions. However, as in the case of the two-winding transformer, the voltage of one of the windings of a three-winding transformer may be very high and it may therefore be desirable to provide indirect means for indicating its temperature because of the difficulty of insulating any temperature indicating apparatus from the high voltage winding or its connection. The general object of the present invention is to provide improved temperature indicating means associated with only two of the windings of a three-winding transformer but adapted to indicate the temperatures of all three windings.

Figure 1:
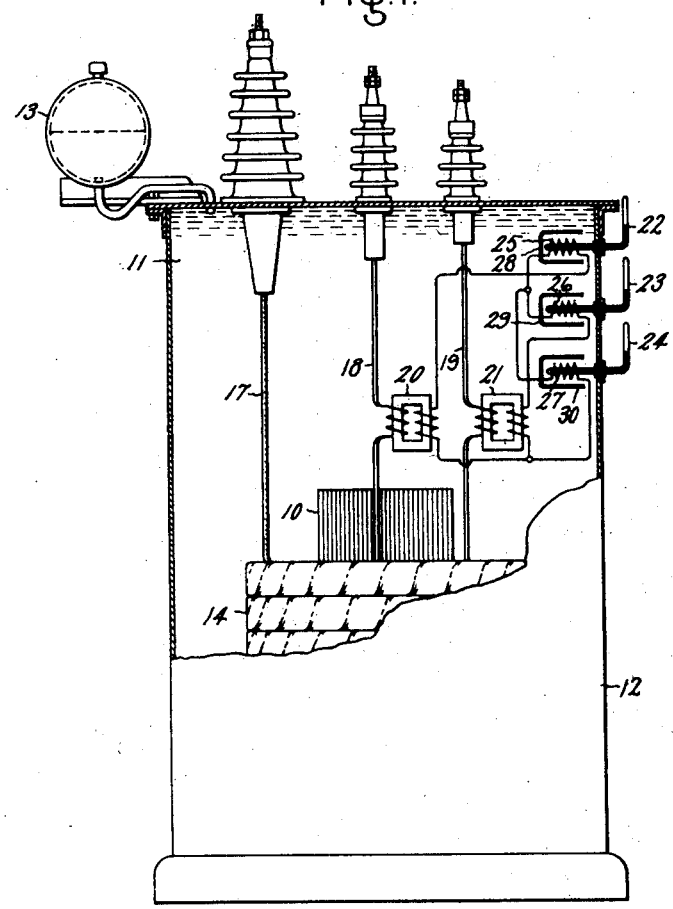
Figure 2:
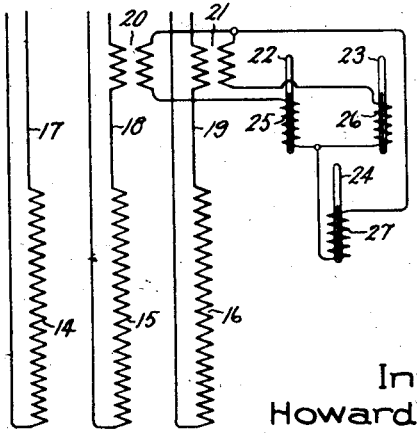

The invention will be better understood from the following description taken in connection with the accompanying drawing in which Fig. 1 is a view of a three-winding transformer provided with temperature indicating means in accordance with the invention, part of the transformer casing being broken away to reveal the temperature indicating means, and Fig. 2 is a diagrammatic view of the three windings and the means for indicating their temperature.

Like reference characters indicate similar parts in both figures of the drawing.

The transformer 10, shown in Fig. 1, is immersed in a body of insulating liquid 11 in a casing 12, the casing being completely filled with the liquid which extends into a conservator 13 to provide for its expansion and contraction under varying conditions. The transformer 10 has three windings 14, 15 and 16 with leads 17, 18 and 19 respectively, extending through insulating bushings to outside terminals.

The primary windings of two current transformers 20 and 21 are connected in series with the leads 18 and 19 of the windings 15 and 16 respectively. Three temperature indicators 22, 23 and 24, shown as simple bulb type thermometers, are provided, the bulb ends of the indicators being located in the insulating liquid 11 near the upper part of the casing 10 and the indicators extending through the casing wall so that the indicated temperatures may be easily observed. The bulb ends of the indicators 22, 23 and 24 are surrounded by heating elements or resistances 25, 26 and 27 respectively, and these heating elements are separately enclosed in heat insulating coverings 28, 29 and 30. The secondary winding of the current transformer 20 is connected in series with the resistance 25, and the secondary winding of the current transformer 21 is connected in series with the resistance 26. Each of these secondary windings with its resistance is connected in series with the other secondary winding and its resistance to form a closed circuit with the voltages of the two windings additive. The resistance 27 is connected in parallel with each of the secondary windings of the current transformers 20 and 21 and its associated resistance. It is obvious now that if the two currents in the secondary windings of the current transformers 20 and 21 are exactly equal, then no current whatever will flow in the resistance 27. The turn ratios of the two current transformers 20 and 21 are so proportioned that the secondary currents in these transformers will be exactly equal when there is no load whatever in the winding 14 and therefore when the volt amperes of the windings 15 and 16 are equal.

The temperature indicators 22 and 23 are responsive to the temperature of the insulating liquid 11 in which their bulbs are immersed and to any additional temperatures due to heating effects of currents in their associated heating elements or resistances 25 and 26. The current in the resistance 25 must always be the same as that in the secondary winding of the transformer 20 and it must therefore be always proportional to the current in the main winding 15. The current in the resistance 26 is always similarly proportional to the current in the main winding 16. By properly proportioning these resistances and by further properly controlling the rate of heat dissipation from these resistances by means of the heat insulating coverings 28 and 29, the temperatures of these resistances may be made to duplicate the temperatures of their associated main windings 15 and 16 respectively, and consequently the temperatures of the windings 15 and 16 will be indicated by the temperature indicators 22 and 23 respectively.

If all three of the main windings 14, 15 and 16 are loaded, then the current in the resistance 27 will be proportional to the volt ampere load in the main high voltage winding 14 regardless of the relative magnitudes and phase angles of the loads in the three windings and consequently the temperature indicator 24 may be made to indicate the temperature of the high voltage winding 14 by properly proportioning the resistance 27 and by further properly controlling the rate of heat dissipation from this resistance 27 by means of its heat insulating covering 30.

The invention provides an economical and reliable arrangement for indicating the temperatures of all three windings of a three-winding transformer without the necessity and difficulty of associating any of the temperature indicating apparatus directly with one of the windings operated at considerable voltage.

The invention has been explained by describing and illustrating a particular arrangement and application thereof but it will be obvious that changes may be made without departing from the spirit of the invention and the scope of the appended claims.

What I claim as new and desire to secure by Letters Patent of the United States, is,—

1. The combination with a transformer having at least three windings, of two series-connected heating elements, means responsive respectively to the currents in two of said windings for maintaining the temperatures of said heating elements approximately the same as the temperatures of said windings, a third heating element connected in parallel with each of the other heating elements, and three temperature indicators controlled by said heating elements respectively for indicating the temperatures of the three transformer windings.

2. The combination with a transformer immersed in an insulating liquid and having at least three windings, of two series-connected heating elements immersed in said liquid, means responsive respectively to the currents in two of said windings for maintaining the temperatures of said heating elements approximately the same as the temperatures of said windings, a third heating element immersed in said liquid and connected in parallel with each of the other heating elements, and temperature indicating means controlled by said heating elements respectively for indicating the temperatures of the three transformer windings.

3. The combination with a transformer having at least three main windings, two current transformers with their primary windings connected in series with two of said main windings respectively, a heating element connected in series with the secondary winding of each current transformer, each secondary winding and its heating element being connected in series with the other secondary winding and heating element with the voltages of said secondary windings additive, a third heating element connected in parallel with each of said secondary windings and its heating element, and temperature indicating means controlled by said heating elements respectively for indicating the temperatures of the three main transformer windings.

4. The combination with a transformer having at least three main windings, two current transformers with their primary windings connected in series with two of said main windings respectively, a heating element connected in series with the secondary winding of each current transformer, each secondary winding and its heating element being connected in series with the other secondary winding and heating element with the voltages of said secondary windings additive, the turn ratios of the two current transformers being proportioned to produce equal secondary currents with equal volt amperes in their respective main transformer windings, a third heating element connected in parallel with each of said secondary windings and its heating element, and temperature indicating means controlled by said heating elements for indicating the temperatures of said three main transformer windings.

HOWARD O. STEPHENS.